Jan. 5, 1960 | N. D. RAVIS ET AL | 2,919,799

PHONOGRAPH RECORD JACKETS

Filed Jan. 30, 1956 | 4 Sheets-Sheet 1

INVENTORS
NORMAN D. RAVIS
HERBERT J. RAVIS

BY Irving Seidman

ATTORNEY

Jan. 5, 1960 N. D. RAVIS ET AL 2,919,799

PHONOGRAPH RECORD JACKETS

Filed Jan. 30, 1956 4 Sheets-Sheet 2

INVENTORS
NORMAN D. RAVIS
HERBERT J. RAVIS

BY Irving Seidman
ATTORNEY

PHONOGRAPH RECORD JACKETS

Filed Jan. 30, 1956 4 Sheets-Sheet 3

INVENTORS
NORMAN D. RAVIS
HERBERT J. RAVIS
BY Irving Seidman.
ATTORNEY

INVENTORS
NORMAN D. RAVIS
HERBERT J. RAVIS
BY
Irving Seidman
ATTORNEY

United States Patent Office 2,919,799

Patented Jan. 5, 1960

2,919,799

PHONOGRAPH RECORD JACKETS

Norman D. Ravis, Hicksville, and Herbert J. Ravis, New York, N.Y.

Application January 30, 1956, Serial No. 562,196

1 Claim. (Cl. 206—62)

This invention relates to jackets or albums for phonograph records and a method of making same.

Broadly, it is an object of the invention to provide a substantially square jacket or envelope for one or more phonograph records having its four outer edges sealed or enclosed.

Another object of the invention is to provide a jacket or closure for one or more phonograph records having its four outer edges sealed and which is cut along a diagonal permitting the jacket to be opened either by pivoting or by separating the jacket for the removal or insertion of the phonograph record.

A further object of the invention is to provide a dust-proof jacket or housing for one or more phonograph records having the four outer edges sealed against dust and moisture.

Heretofore, jackets or housings for phonograph records have been made with three edges sealed and one edge open to permit the phonograph record to be inserted in the housing. The open edge permits dust to enter thus filling the grooves in the phonograph record and impairing the fidelity of the sound transcription. Dust in the record grooves also creates additional friction and wear causing the record to deteriorate more rapidly than under dust free use. Since it is important to keep the phonograph records free of dust, various means have been used to house and store phonograph records dust free, such as the placing of each phonograph record in a plastic envelope before housing it in a jacket with three sealed edges. This bulks the housing with consequent loss of storing space, adds to the cost of storing phonograph records and increases the time of handling such phonograph records by a user.

In the jackets or housings herein provided the use of such plastic envelopes is avoided since the phonograph records are stored flat and in sealed dust free jackets or housings.

By eliminating the use of plastic envelopes for phonograph records, the use of our jackets saves (1) space, (2) cost of such plastic envelopes and (3) time in handling of the phonograph records when being used.

For a fuller understanding of the nature and objects of the invenion reference is had to the following detailed description in connection with the accompanying drawings, in which.

Figure 1:
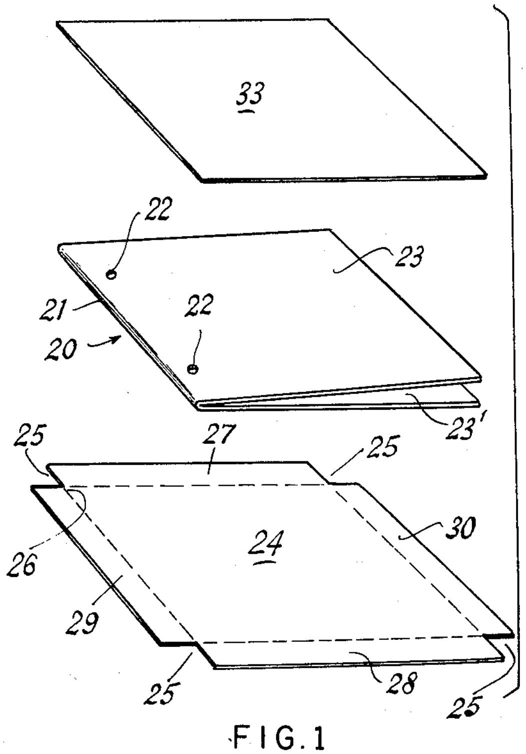
Fig. 1 is an isometric perspective schematic view of the parts of a jacket of phonograph records to illustrate the steps in the method of making such a jacket.
Figure 2:
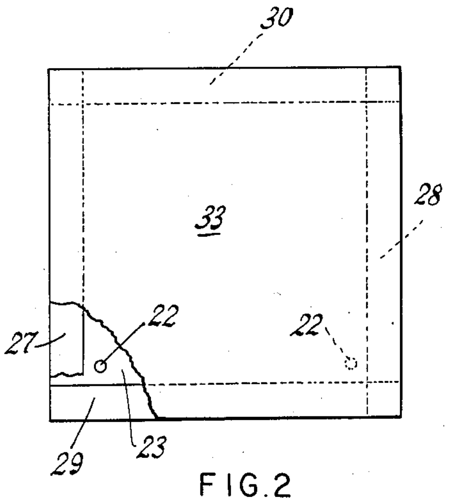
Fig. 2 is a plan view of a completed jacket, showing part of the label torn away to show the construction.
Figure 3:
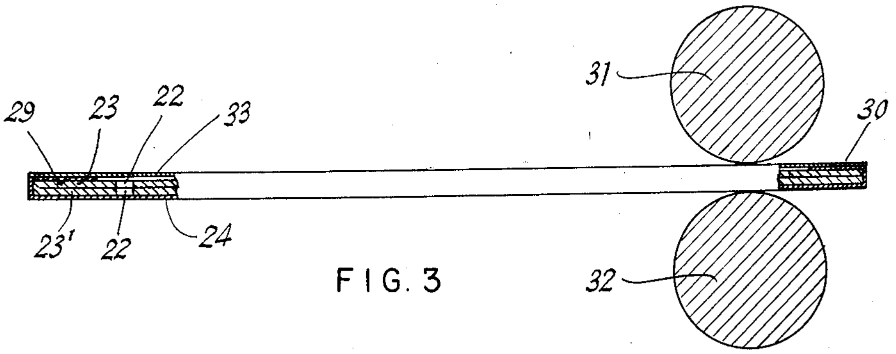
Fig. 3 is a schematic plan view, showing parts broken away to explain the method of construction.
Figures 4, 5, 6, 6A:
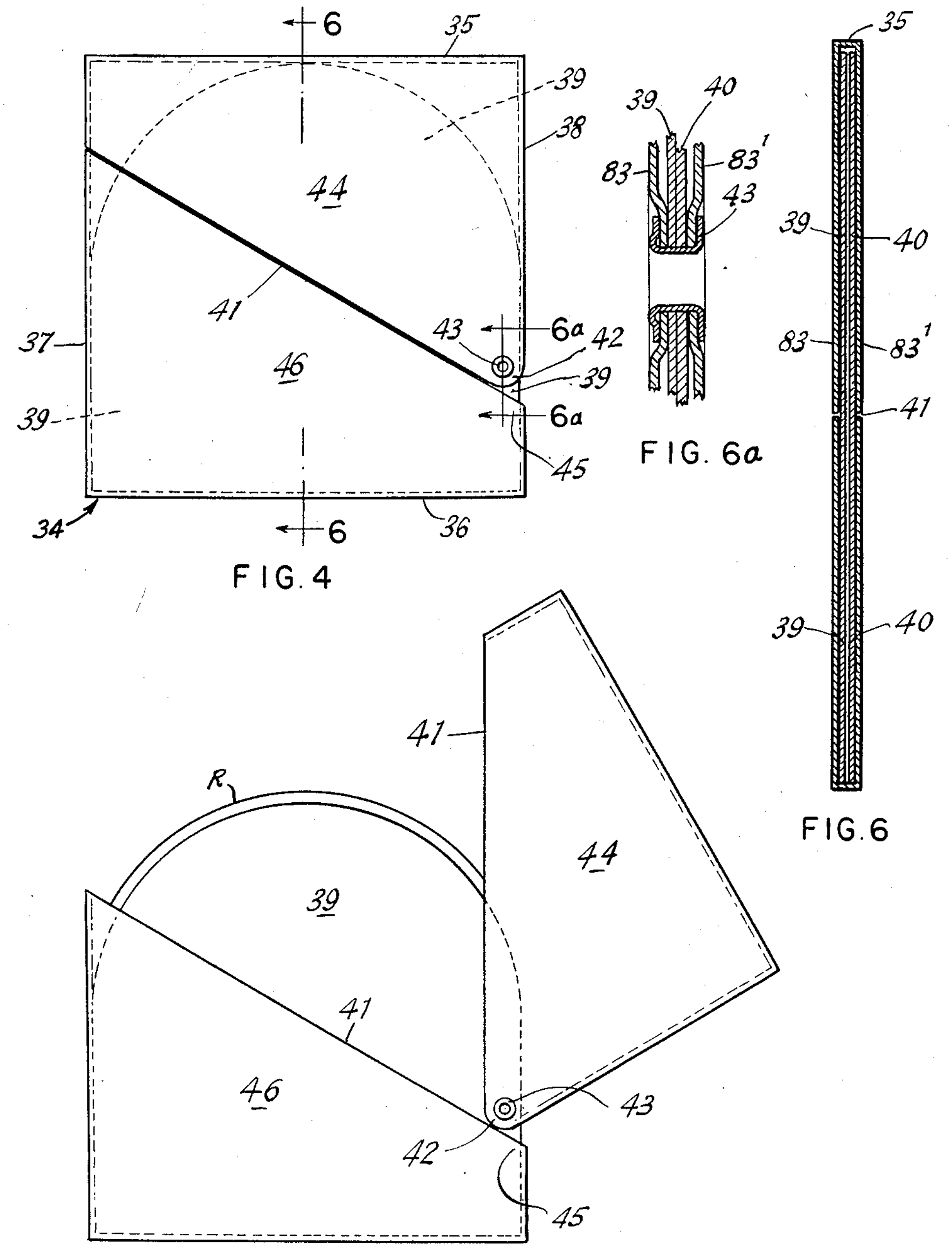
Fig. 4 is a plan view showing one form of jacket in closed position.
Fig. 5 is a plan view of the jacket in open position, shown in Fig. 4.
Fig. 6 is a sectional view taken along line 6—6 of Fig. 4.

Fig. 6*a* is an enlarged sectional view taken along line *6a—6a* of Fig. 4.

Figure 7:
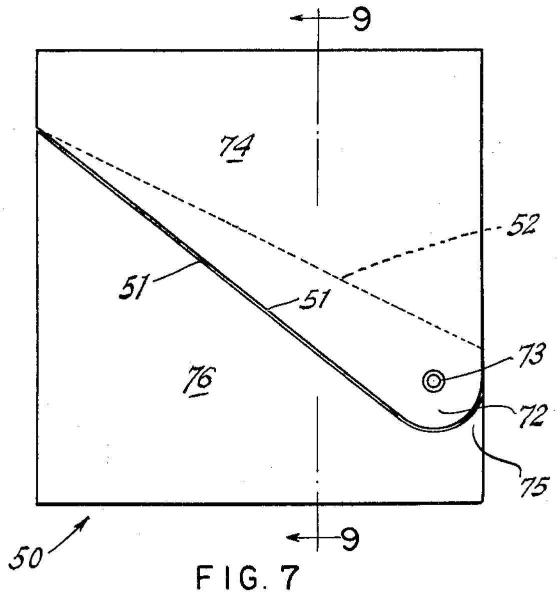

Fig. 7 is a plan view of a modification of the jacket shown in Figs. 4–7, shown in closed position.

Figure 8:
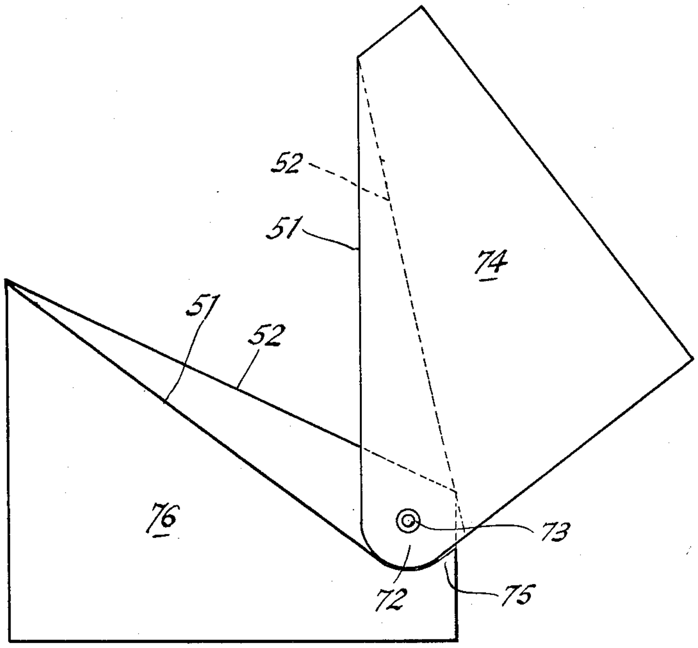

Fig. 8 is a plan view of the jacket shown in Fig. 7 in open position.

Figure 9:
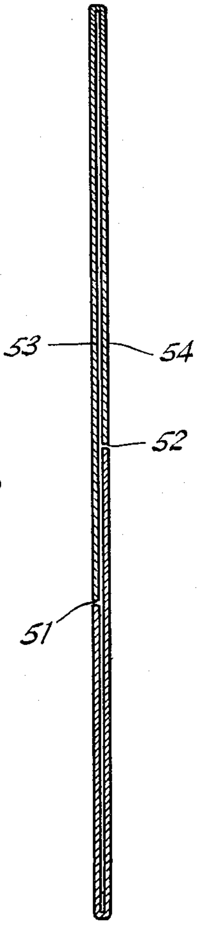

Fig. 9 is a sectional view taken along line 9—9 of Fig. 7.

Figure 10:
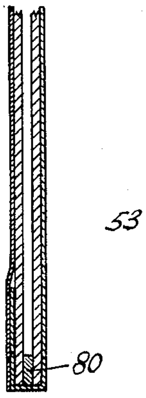

Fig. 10 is an enlarged sectional view showing the use of a backbone or spine which can be used on the different forms of jackets of the invention.

Figure 11:
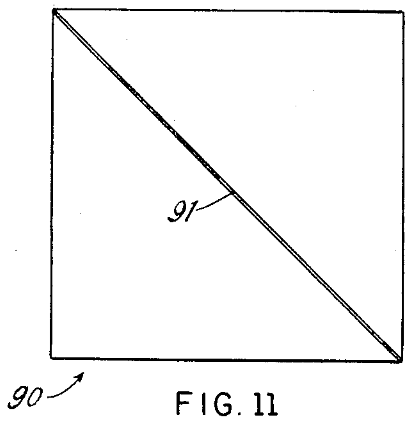

Fig. 11 is a plan view of another modified jacket.

Figure 12:
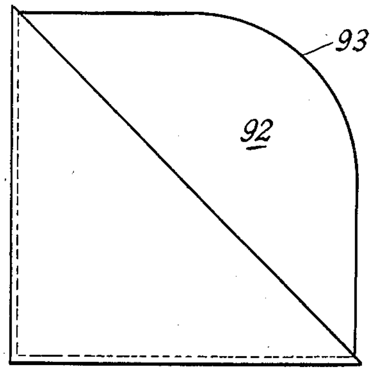

Fig. 12 is a plan view of one half of the jacket shown in Fig. 11 with a divider inserted therein.

Figure 13:
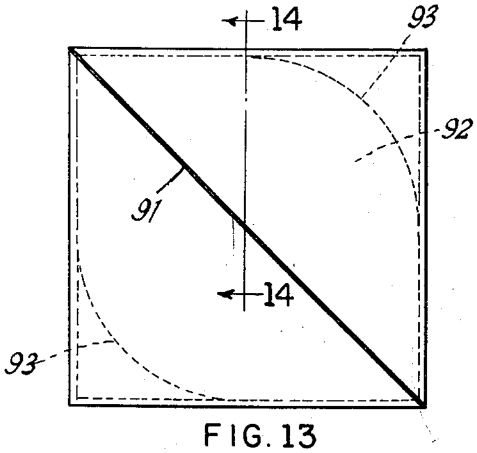

Fig. 13 is a plan view of the jacket shown in Fig. 11 with a divider inserted in each half of the jacket.

Figure 14:
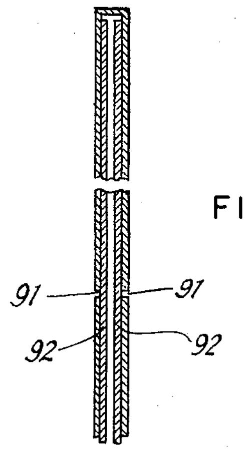

Fig. 14 is an enlarged vertical cross sectional view taken through line 14—14 of Fig. 13.

Figure 15:
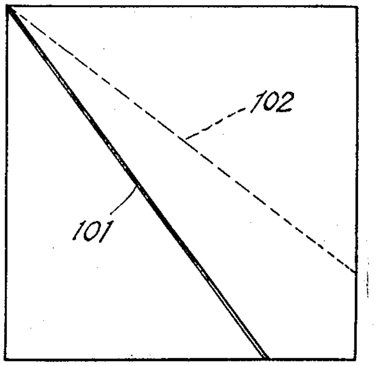

Fig. 15 is a plan view of still another modified jacket.

Figure 16:
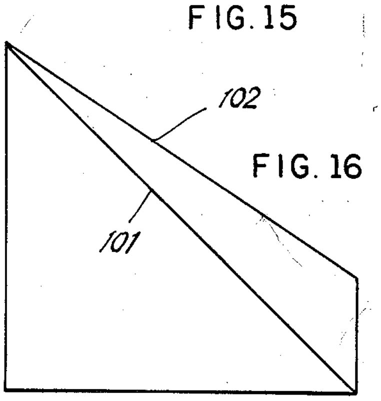

Fig. 16 is one half of the jacket shown in Fig. 15.

In the following specification and claim, we will refer to the invention as jackets, although the product may be called a housing, closure, envelope or album.

The method of making one of our phonograph record jackets is as follows:

A piece of cardboard 20 is scored in the center and folded along fold line 21, making a substantially square piece of cardboard. Holes 22 are punched through both layers of cardboard 23, 23' adjacent one edge, in this instance, the fold edge 21, which act as air escape holes. Instead of a single folded over piece of cardboard 20, two substantially square like pieces of cardboard may be used. This folded piece of cardboard 20, is then placed upon a smooth paper backing sheet 24 somewhat larger than the folded cardboard 20, having cutouts 25 at each of the four corners, providing flaps or extensions 27, 28, 29, 30. The backing sheet has been previously covered with a suitable adhesive. The flaps 27 to 30, inclusive between the inner corners 26 are about the width of the folded cardboard 20. The overlapping flaps or extensions 27 to 30, inclusive, are then folded upwardly and over the four edges of the folded cardboard 20 sealing the four edges.

However, the holes 22 are exposed on the upper side 23 since the flaps, or flap 29 is not sufficiently wide to cover the holes 22. The folded cardboard 20 and backing paper 24 are then passed between a pair of pressure rollers 31, 32 with holes 22 at the farther edge of the cardboard to provide an even and perfectly smooth surface. The holes 22 permit the air to escape and prevent the bursting of the seams or edges of the jacket. A cover label 33, either the exact size of the cardboard 20 or almost the complete area of the jacket is then applied to the upper face, that is the face opposite the backing sheet 24, by pasting it thereon with a suitable adhesive. This label 33 covers the entire face of the jacket except possibly for a slight margin around the four sides and also covers the holes 22. The jacket then is again passed between the pressure rollers 31, 32 with the holes 22 at the farther edge of the cardboard away from the rollers to provide a smooth, flat face surface. Any air which may have become lodged between the label 33 and the cardboard will be expelled by the time the end of the label reaches the holes.

The jacket is then die cut as hereinafter described, either by cutting through both covered outer pieces of cardboard 23, 23' or singly through one side at a time if one edge is to be offset as shown in Figs. 7, 8, 15 and 16.

Dividers or inserts and flat rivets or eyelets are then added as hereinafter shown and described, depending upon the type or kind of jacket to be made.

Referring to Figs. 4 to 6*a*, inclusive, numeral 34 represents a phonograph record jacket made in accordance with the method hereinbefore described containing a record R and having the four outer edges 35, 36, 37 and 38 sealed. The jacket 34 is die cut through both cardboards 83 and 83' along diagonal line 41 as shown, at the same time so that the cut lines 41 of the opposed cardboards coincide. The cardboards 83, 83' are covered by backing sheet and label although not shown so in Fig. 6. It should be noted that the cut line 41 is somewhat away from the opposite corners and that the lower corner of the top portion is arcuately cut at 42 while the corner 45 of the lower portion 46 of the jacket is cut along the diagonal 41. A like pair of cardboard dividers 39, 40, having the upper end semicircular and right angle lower corners, and of a width to fit snugly into the jacket 34 so that the dividers are held within the jacket by frictional engagement, and inserted within the jacket. An eyelet 43 passes through both dividers 39, 40 and through the covered cardboards 83, 83', of the jacket, at the lower arcuate corner 42 permitting the upper portion 44 of the jacket to pivot outwardly, as shown in Fig. 5 for removing and inserting phonograph records. The flanges of the eyelet are flush with the outer faces of the jacket so that in storing or filing the phonograph records and jackets by sliding them vertically into position, the eyelet 43 will not mar the adjacent jackets.

By using two dividers 39, 40, either one, two or three phonograph records may be stored in the single jacket. If a single phonograph record is stored, it will have double protection on each side. However, a single divider may be used to store one or two phonograph records in a single jacket, or more than two dividers may be used in a single jacket to store more than three phonograph records. In the latter case, it is evident that the jacket will have a greater thickness to accommodate the greater number of dividers and phonograph records.

If, for any reason, the corner 45 of the lower portion 46 is objectionable, possible because a slight portion of the divider 39 is visible, corner 45 can be made as shown in Figs. 7 and 9 and the arcuate edge 42 can easily override the corner of the lower portion because of the flexibility of the cardboard and the thinness of it.

Referring to Figs. 7 to 9, numeral 50 represents a modified form of phonograph record jackets also made in accordance with the method hereinbefore described and having the four outer edges seated. This jacket is different from the jacket of Figs. 4 to 6*a*, primarily in that the diagonal cut line of the opposed cardboards does not coincide with one another, but the diagonal cut line 51 passes through one cardboard face 53 while the other diagonal cut line 52 passes through the opposite cardboard face 54 and is offset at the lower end providing a support for the phonograph record and sufficient cardboard to permit an eyelet 73 to hold the opposed cardboards of the jacket together, as shown in Figs. 7 and 8. The lower corner 72 of the upper portion 74 is arcuately cut and readily overrides the lower corner 75 of the lower portion 76 because of the thinness and flexibility of the cardboard. However, if desired corner 75 can be removed and the lower portion at this corner can be made like the corner 45 of Fig. 4, that is the diagonal cut line 51 can run along a straight line.

It is evident that one or more dividers, like 39 shown in Fig. 4, can be used with the jacket shown in Figs. 7 and 9.

It is also evident that in place of the eyelets 43 and 73 herein mentioned, flat rivets can be used so that the flanges of the rivets will remain flush with the opposed faces of the jacket.

Fig. 10 shows the use of a backbone or spine 80 which may be used with any of the jackets herein described. The spine 80 is a narrow strip of cardboard pasted adjacent one inner edge of the cardboard of the jacket, preferably along the edge opposite the eyelet edge and along the full height of the jacket to provide a flat leading edge and somewhat wider edge surface for the printing of the title of the record or records stored within the jacket. Of course, if the jacket is made to house more ply records the spine 80 would be made thicker to accommodate such records and titles. The spine 80 also provides greater rigidity to the jacket.

Referring to Figs. 11 to 14, inclusive, numeral 90 represents another modified form of phonograph record jacket also made in accordance with the method hereinbefore described and having the four outer edges sealed. In this form the jacket is cut diagonally from corner to corner through the opposed cardboards along line 91 so that the cut line 91 coincides both front and back providing two triangular like portions. A phonograph record may be stored in this jacket without a divider, protector or separator, if desired, since the phonograph record will hold the two portions of the jacket together. However, it would be better if one or more dividers are used. A divider 92 having one corner arcuate as at 93 and the opposite diagonal corner being a right angle, is provided which holds the divider within one half of the jacket by frictional engagement as hereinbefore stated for the other types of jackets. The opposite portion of the jacket need not have a like divider. If, however, it is desired to protect both sides of the phonograph record or to store more than one record in this jacket, it is preferable to have a like divider in the opposite half of the jacket.

The jacket 100 shown in Figs. 15 and 16 is also made with the four outer edges sealed, as heretofore described in the method of making the jacket. However, this jacket is cut diagonally from corner to corner along line 101 along one face and is offset on the opposite face along cutting line 102 providing a larger supporting surface for the phonograph record. The opposed portion of the jacket is exactly like the first portion. The phonograph record holds the two portions of the jacket together very much like the jacket of Figs. 11–14. Dividers like 92 may be used with this type of jacket.

It is evident that various changes and modifications may be made in the jackets for phonograph records hereinbefore described and in the method of making same without departing from the general spirit of the invention.

It is also within the scope of the invention to paste the divider or dividers at a portion within the jacket to firmly hold it therein or to fix it therein by any other known method, such as stapling or otherwise.

It is also within the scope of this invention to make one or more dividers a part of the inner cardboard members and by folding such dividers inwardly such dividers are thus part of the complete jacket so that time and operations are saved.

It is obvious that a jacket can also be made with the four outer edges sealed as hereinbefore described but that the cut, instead of diagonal, may be transverse or parallel to the opposed sides and may be in the center or otherwise located and the cut may be through both faces simultaneously or offset as heretofore described for the species cut diagonally.

We claim:

The combination of a phonograph record and a substantially square jacket therefor, said jacket comprising a pair of like opposed substantially square cardboards formed by folding a single sheet of cardboard along its center line, a substantially square backing sheet larger than said cardboards having cutouts at the corners covering the outer face of one of said cardboards, said backing sheet overlapping all the edges of the other of said cardboards sealing all the outer edges of said jacket, a substantially square covering label substantially covering the outer face of the other of said cardboards and the overlapped portions of said backing sheet, said opposed cardboards, backing sheet and covering label diagonally cut providing two jacket portions each having a short side and a long side shorter than said jacket, a divider within said jacket, the upper edge of said divider being arcuate in the configuration of a record, pivot means at the lower corner of one jacket portion, said pivot means passing through said jacket and divider permitting said two jacket portions to separate for storing said phonograph record within said jacket.

References Cited in the file of this patent

UNITED STATES PATENTS

| | | |
|---|---|---|
| 1,406,939 | Currie | Feb. 14, 1922 |
| 1,735,325 | L'Enfant | Nov. 12, 1929 |
| 2,371,557 | Sullivan | Mar. 13, 1945 |
| 2,384,633 | Markowski | Sept. 11, 1945 |
| 2,628,619 | Froehlig | Feb. 17, 1953 |
| 2,671,384 | D'Ambrosio | Mar. 9, 1954 |
| 2,687,067 | Arneson | Aug. 24, 1954 |